(12) United States Patent
Karlsson

(10) Patent No.: US 9,853,572 B2
(45) Date of Patent: Dec. 26, 2017

(54) BRIDGE LEG CIRCUIT

(71) Applicant: Inmotion Technologies AB, Stockholm (SE)

(72) Inventor: Ulf Bengt Ingemar Karlsson, Bagarmossen (SE)

(73) Assignee: Inmotion Technologies AB (SE)

( * ) Notice: Subject to any disclaimer, the term of this patent is extended or adjusted under 35 U.S.C. 154(b) by 132 days.

(21) Appl. No.: 14/652,309

(22) PCT Filed: Nov. 28, 2013

(86) PCT No.: PCT/EP2013/074982
§ 371 (c)(1),
(2) Date: Jun. 15, 2015

(87) PCT Pub. No.: WO2014/095297
PCT Pub. Date: Jun. 26, 2014

(65) Prior Publication Data
US 2015/0326145 A1 Nov. 12, 2015

(30) Foreign Application Priority Data
Dec. 21, 2012 (EP) .................................. 12198978

(51) Int. Cl.
*H02M 3/335* (2006.01)
*H02M 7/5387* (2007.01)
(Continued)

(52) U.S. Cl.
CPC .......... *H02M 7/5387* (2013.01); *H02M 7/493* (2013.01); *H02M 2001/342* (2013.01); *Y02B 70/1491* (2013.01)

(58) Field of Classification Search
CPC ......... H02M 7/5387; H02M 2001/342; H02M 7/493; G05F 1/10; Y02B 70/1491
(Continued)

(56) References Cited

U.S. PATENT DOCUMENTS 4,654,568 A * 3/1987 Mansmann ............... H02P 7/04
318/256
5,081,409 A 1/1992 Goff
(Continued)

FOREIGN PATENT DOCUMENTS

JP 20000324851 11/2000

OTHER PUBLICATIONS

Dong, W. et al., "A simplified control scheme for zero voltage transition (ZVT) inverter using coupled inductors," Jun. 2000, pp. 1221-1226, vol. 3, No. 18, Power Electronics Specialists Conference, Institute of Electrical and Electronics Engineers.
(Continued)

*Primary Examiner* — Jue Zhang
*Assistant Examiner* — Jye-June Lee
(74) *Attorney, Agent, or Firm* — RatnerPrestia

(57) ABSTRACT

A bridge leg switching a DC voltage to produce an AC voltage at its output terminal for supply to an inductive load. The bridge leg has first, second, third, and fourth switch assemblies, and at least a first inductive element. The first and second switch assemblies are serially connected between the bridge leg input terminals, the bridge leg output being formed at a point of interconnection of the first and second switch assemblies. The third and fourth switch assemblies are serially connected between the bridge leg input terminals, the inductive element being connected between a point of interconnection of the third and fourth switch assemblies and the bridge leg output. The third and fourth switch assemblies are controlled such that reverse current through either of the first or second switch assembly is reduced compared to bridge leg output current prior to the moment the bridge leg output is switched.

26 Claims, 12 Drawing Sheets

(51) Int. Cl.
*H02M 1/34* (2007.01)
*H02M 7/493* (2007.01)

(58) Field of Classification Search
USPC .......................................................... 363/132
See application file for complete search history.

(56) References Cited

U.S. PATENT DOCUMENTS

| | | | | |
|---|---|---|---|---|
| 7,969,225 | B2* | 6/2011 | Ho | H03K 17/567 |
| | | | | 327/110 |
| 2002/0054499 | A1 | 5/2002 | Tanaka | |
| 2005/0001706 | A1* | 1/2005 | Ingemar Karlsson | G01R 15/185 |
| | | | | 336/182 |
| 2008/0259645 | A1* | 10/2008 | Herty | H02M 3/337 |
| | | | | 363/17 |
| 2009/0237043 | A1* | 9/2009 | Glovinsky | H02M 1/34 |
| | | | | 323/235 |

OTHER PUBLICATIONS

International Preliminary Report on Patentability for International Application No. PCT/EP2013/074982 dated Mar. 24, 2015.
International Search Report for International Application No. PCT/EP2013/074982 dated Sep. 30, 2014.
Reply to the International Preliminary Report on Patentability dated Nov. 25, 2014, pp. 1-16.
Japanese Office Action dated Dec. 7, 2015 for JP Application No. 2015-548317, including English translation.

* cited by examiner

BRIDGE LEG CIRCUIT

This application is a National Stage Application of International Application No. PCT/EP2013/074982, filed Nov. 28, 2013, which claims priority to EP12198978.4, filed Dec. 21, 2012, the entire disclosures of which are expressly incorporated by reference herein.

TECHNICAL FIELD

The invention relates to bridge legs switching a DC voltage at its respective input terminal to produce an AC voltage at its output terminal for supply to an inductive load.

BACKGROUND

Bridge legs in the art for high current low voltage switching contain switches that normally are embodied in the form of a number of parallel metal-oxide-semiconductor field-effect transistors (MOSFETs) for controlling current supplied to an inductive load in the form of a motor. During the last years, on-resistance for the MOSFETs has continually been reduced such that a point has been reached where the switching losses in the motor controller have started to dominate. This makes the benefits of further improvements in MOSFET on-resistance insignificant unless the switching losses can be further reduced.

One factor that makes it difficult to reduce the switching losses is the performance of the MOSFET intrinsic body diode. The performance of this diode has not improved as much as many of the other properties of the MOSFET.

At a sufficient gate voltage, a MOSFET will be turned on with a low on-resistance, for example about 4-5 mohm for a 75 V MOSFET at high junction temperatures. In this on-state, the MOSFET will conduct current both in a forward and a reverse direction. In this context, the forward direction is the "desired" direction, i.e. the direction where the current can be controlled by the switches by applying an appropriate control signal to a respective switch control gate, whereas the reverse direction is the "undesired" direction where the current cannot be controlled by the switches by applying an appropriate control signal to a respective switch control gate.

However, the MOSFET transistor has an intrinsic body diode that conducts current in the MOSFET reverse direction if the transistor is in off state. In order to avoid current shoot through in a bridge leg, a deadband in time is used between control signals for switching the respective MOSFET, typically around 1-2 us. During this interval the current will be transferred from the channel in the MOSFET to the intrinsic body diode of either of the two switches of the bridge leg depending on direction of load (motor) current. After the dead-band time the other switch in the bridge leg is turned-on. Now the reverse recovery current will increase to a value higher than load (motor) current in order to recharge the diode and extinguish the current through the diode.

Hard switching of inductive load, as described above, will generate diode recovery of transistor body diode or separate anti-parallel connected diode. This diode recovery will generate shoot through currents with uncontrolled di/dt during the recovery part of the switching in the bridge leg, which generates EMC emissions. Traditionally, these conventional switches have had a limited upper switching rate of approximately 10-25 kHz and have required a relatively large heat-sink in order to dissipate losses resulting from current conduction and switching.

SUMMARY

An object of the present invention is to solve or at least mitigate this problem in the art and to provide an improved bridge leg.

This object is attained in a first aspect of the present invention by a bridge leg switching a DC voltage at its respective input terminal to produce an AC voltage at its output terminal for supply to an inductive load. The bridge leg comprises a first switch assembly, a second switch assembly, a third switch assembly, a fourth switch assembly and at least a first inductive element. The first switch assembly and the second switch assembly are serially connected between the bridge leg input terminals, the bridge leg output being formed at a point of interconnection of the first switch assembly and the second switch assembly. The third switch assembly and the fourth switch assembly are serially connected between the bridge leg input terminals, the inductive element being connected between a point of interconnection of the third switch assembly and the fourth switch assembly and the bridge leg output. The third switch assembly and the fourth switch assembly are controlled such that reverse current through either of the first switch assembly or the second switch assembly is reduced compared to bridge leg output current prior to the moment of switching of the bridge leg output.

This object is attained in a second aspect of the present invention by a bridge leg switching a DC voltage at its respective input terminal to produce an AC voltage at its output terminal for supply to an inductive load. The bridge leg comprises a first switch assembly, a second switch assembly, a third switch assembly, a fourth switch assembly, a first inductive element, a second inductive element, a first diode and a second diode. The first switch assembly and the second switch assembly are serially connected between the bridge leg input terminals, the bridge leg output being formed at a point of interconnection of the first switch assembly and the second switch assembly. The third switch assembly and the first diode are serially connected between the bridge leg input terminals, the first inductive element being connected between a point of interconnection of the third switch assembly and a cathode terminal of the first diode switch assembly and the bridge leg output. The second diode and the fourth switch assembly are serially connected between the bridge leg input terminals, the second inductive element being connected between a point of interconnection of an anode terminal of the second diode and the fourth switch assembly and the bridge leg output. The third switch assembly and the fourth switch assembly are controlled such that reverse current through either of the first switch assembly or the second switch assembly is reduced compared to bridge leg output current prior to the moment of switching of the bridge leg output.

This object is attained in a third aspect of the present invention by a bridge leg switching a DC voltage at its respective input terminal to produce an AC voltage at its output terminal for supply to an inductive load. The bridge leg comprises a first switch assembly, a second switch assembly, a third switch assembly, a fourth switch assembly, a first inductive element and at least a second inductive element. The first switch assembly and the second switch assembly are serially connected between the bridge leg input terminals and the second inductive element is connected between a point of interconnection of the first switch assembly and the second switch assembly and the bridge leg output. The third switch assembly and the fourth switch assembly are serially connected between the bridge leg input terminals, the first inductive element is connected between a point of interconnection of the third switch assembly and the fourth switch assembly and the bridge leg output. The third switch assembly and the fourth switch assembly are controlled such that reverse current through either of the first switch assembly or the second switch assembly is reduced compared to bridge leg output current prior to the moment of switching of the bridge leg output.

Advantageously, the bridge leg according to embodiments of the first, second and third aspects of the present invention, being controlled by means of pulse width modulation (PWM), comprises two main switches (the first and second switch assembly), two additional help switches (the third and fourth switch assembly) and one or more additional inductors that eliminate diode recovery current of the hard switching main switches. The control of the additional help switches may be synchronized with the PWM control signals of the main switches. Thus, as compared to bridge legs in the art, the current at switching is temporarily taken over by the additional help switches via the inductor(s) in order to avoid diode reverse recovery of the main switches. The energy stored in the inductor(s) is feed back to the DC bus.

The diode recovery current is one of the main sources for electromagnetic compatibility (EMC) emissions in motor control units, and hence the EMC will be reduced due to the elimination of diode recovery currents. Since the switching losses and EMC emissions can be reduced, either heat-sink size can be reduced, rating of the motor controller can be increased or alternatively a combination of the both is possible. Space is very limited in many motor control applications, for example fork-lift trucks, and a smaller heat-sink is very advantageous.

Advantageously, the reverse current through either of the first switch assembly or the second switch assembly should be substantially reduced compared to bridge leg output current prior to the moment of switching of the bridge leg output, preferably with as much as 50% or more.

Due to the topology of the bridge leg according to embodiments of the present invention, the flow of reverse current through the respective anti-parallel diode of the main switches can be prevented. As the reverse recovery characteristics of the diode limits the switching speed of a motor controller unit in which the bridge leg is implemented, it is advantageous to avoid this current flow.

In an embodiment of the present invention, the third switch assembly and the fourth switch assembly, i.e. the help switches, are controlled such that the reverse current through the first switch, i.e. one of the main switches, is reduced compared to load current prior to the moment when the first switch is turned-off and that the reverse current through the second switch, i.e. the other one of the main switches, is reduced compared to load current at the moment when the second switch is turned-off. Advantageously, the help switches temporarily "take over" the current from the main switches.

In a further embodiment of the present invention, the help switches are controlled such that current through the first switch is zero or in forward direction prior to the moment when the first switch is turned-off and that current through the second switch is zero or in forward direction prior to the moment when the second switch is turned-off. Advantageously, the help switches temporary takes over the current from the main switches which should be turned-off so the transistors of the main switches can turn-off in zero or positive current condition instead of when a negative current is flowing in the transistors.

It should be noted that a switch, can be formed from a single MOSFET transistor or from several MOSFET transistors connected in parallel. Further, a switch can also be made up of a single IGBT or several IGBTs in parallel, in particular for IGBTs with intrinsic diodes. Further, a switch can be made up of silicon carbide (SiC) or gallium nitride (GaN) transistors, single or in parallel.

Further, the bridge leg according to aspects of the present invention can be applied in inverters and power converters. Since an increase in switching frequency is enabled. Thus filter inductances between a power stage output and an AC load can be down-scaled. This is possible since the increased switching frequency leads to increase in frequency of voltage output harmonics which are easier to filter therefore requiring smaller filter inductances.

The bridge leg can for instance be applied in a three-phase AC control unit for control of an electrical motor in an industrial fork-lift truck. The motor to be controlled can be of different types, for example; 3-phase electrical motor, DC motor, 3-phase asynchronous motor (induction motor), permanent motor (PM) or reluctance type motor. Examples of applications for the motors are traction and hydraulic pump in fork lifts.

This invention makes it possible to limit rate of fluctuations in current, i.e. di/dt, of the main switch when conducting current in the reverse direction of the switch. It is possible to have either of the main switches ON until the reverse current has been reduced to zero or even is conducted in a forward direction without risk of uncontrollable bridge leg shorts.

Further features of, and advantages with, the present invention will become apparent when studying the appended claims and the following description. Disclosed features of example embodiments may be combined to create embodiments other than those described in the following as readily understood by one of ordinary skill in the art to which this invention belongs, without departing from the scope of the present invention, as defined by the appended claims.

BRIEF DESCRIPTION OF THE DRAWINGS

The invention is now described, by way of example, with reference to the accompanying drawings, in which.

DETAILED DESCRIPTION

Figure 1:
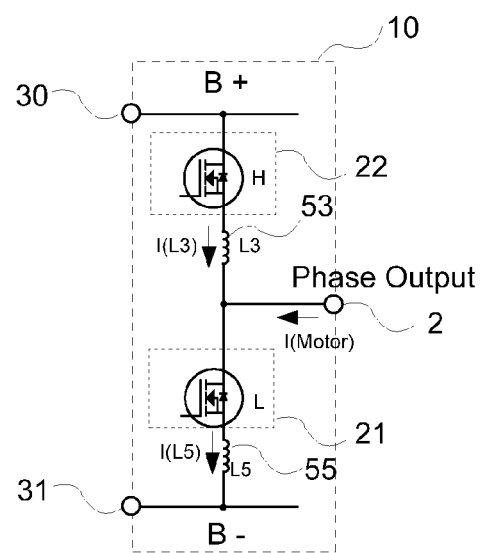
FIG. 1 is a schematic view of a conventional prior art bridge leg for use with an inductive load.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable. The first and second switch assemblies defined in the appended claims are occasionally referred to as main switches throughout the description, while the third and fourth switch assemblies occasionally are referred to as help switches throughout the description.

FIG. 1 is a schematic view of a conventional prior art bridge leg 10 for use with an inductive load. The bridge leg 10 comprises a pair of switches 21, 22 embodied in the form of MOSFETs arranged on opposite sides of the bridge leg output 2. The first switch 22 has its drain terminal connected to positive rail B+ of a first bridge leg input terminal and its source terminal connected to the bridge leg output 2 and thus the inductive load (not shown). The second switch 21 has its drain terminal connected to the bridge leg output and the inductive load, and its source terminal connected to the negative rail B− of a second bridge leg input terminal, to which input terminal a source voltage is connected. By supplying gate signals to the switches 22 and 21 the load can selectively be connected to B+ or B− via the bridge leg output 2. In order to complete an H-bridge, a further more bridge leg 10 is required, or alternatively two more bridge legs 10 for a three-phase bridge (subsequently shown in FIG. 3). Terminals B+ and B− forms a DC bus and DC bus capacitors are connected to B+ and B− physically close to the switches in order to minimize voltage overshoots. Further, B+ and B− can via the terminals 30, 31 be connected to a DC source such as a battery or an AC to DC rectifier DC output.

As previously discussed, the MOSFETs in the bridge leg switches 21, 22 have intrinsic body diodes. Inductances 53 and 55 represent stray inductances caused by wiring, where each stray inductance 53, 55 is serially connected to the respective switch. Gate signals are provided for operation of the switches 21, 22.

Figure 2:
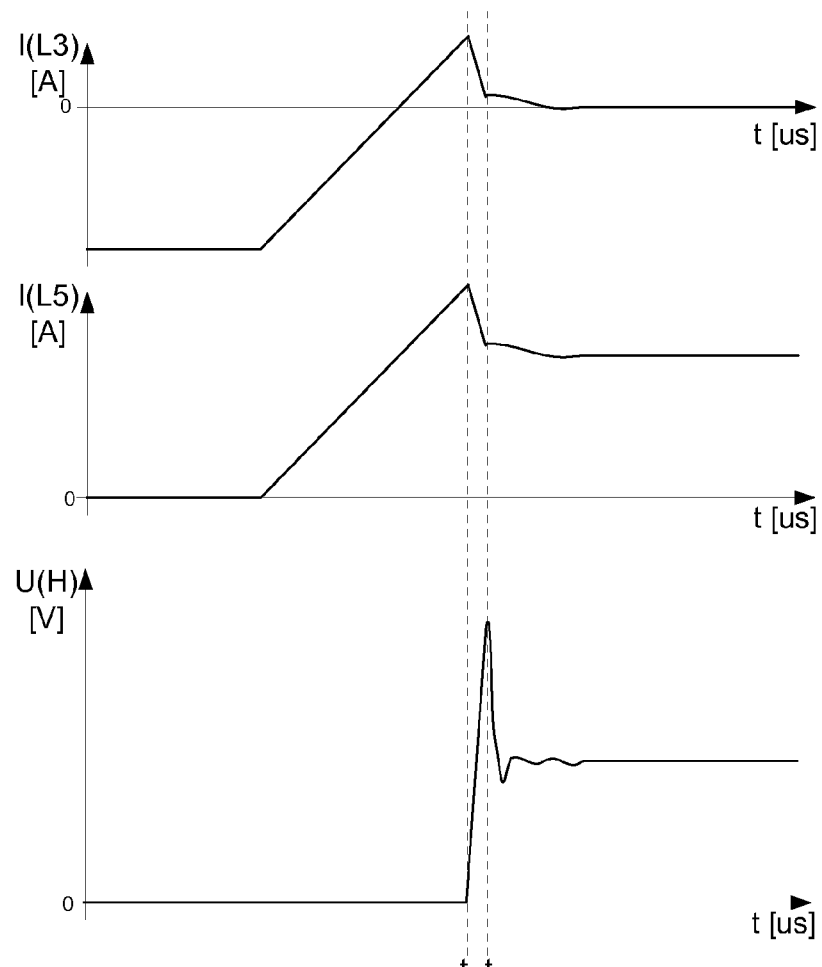
FIG. 2 illustrates transfer of output inductive current from upper switch to lower switch in the prior art bridge leg of FIG. 1.

FIG. 2 illustrates transfer of output inductive current from upper switch 22 to lower switch 21. Directions of currents are as shown in FIG. 1. Prior to transfer of the motor current from the upper switch 22 to the lower switch 21, the current in the upper switch 22 is negative (i.e. motor current is flowing in to the bridge leg output terminal 2). First, the upper switch 22 is turned off, and the current flows from the MOSFET channel to the body diode of the upper switch 22. After a dead-band of typically 1-2 us, the lower switch 21 is turned on and the current flows from the upper switch 22 to the lower switch 21. However, when the body diode of the upper switch 22 has conducted current, it holds residual charge and cannot stop conducting until the charge has dissipated. During the charge dissipation the body diode in the upper switch 22 forms a short circuit from B+ to bridge leg output 2, which allows a large reverse recovery current to flow from B+, through the body diode in the upper switch 22 and further through the lower switch 21 to B−, which is shown as an overshoot in the current I(L5). As the body diode of the upper switch 22 discharges, the current I(L3) through the upper switch 22 rapidly falls down to zero. When this occur, the voltage U(H) of the upper switch 22 rises to an overshoot due to additional voltage generated over the stray inductance 53. The rapid transactions of current and voltage will cause high frequency oscillations that are problematic from an EMC perspective.

Figure 3:
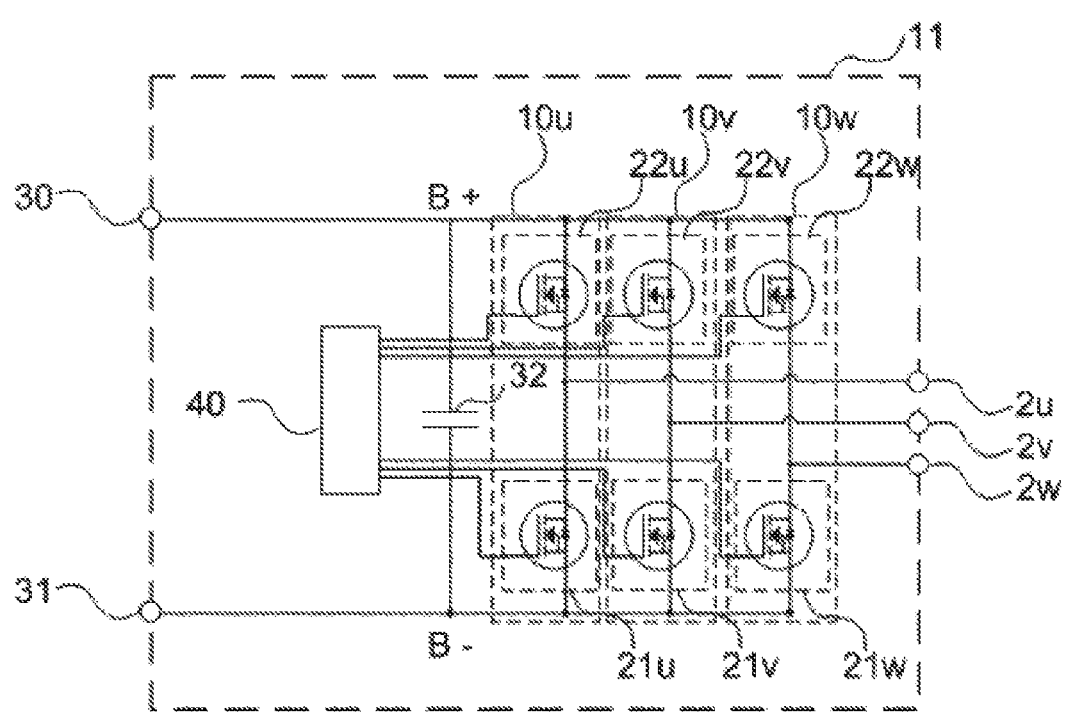
FIG. 3 shows three bridge legs as illustrated in FIG. 1 configured into forming a three-phase DC/AC converter.

FIG. 3 shows three bridge legs (10u, 10v, 10w) as illustrated in FIG. 1 configured into forming a three-phase DC/AC converter 11. The three phases U, V and W are connected via the three-bridge leg output 2u, 2v, 2w to an inductive load in the form of e.g. an electrical motor and the fundamental voltage amplitude and frequency of signals supplied to the motor are controlled by pulse width modulation, PWM. A microcontroller and a gate driver 40 generate PWM gate signals for all switches 21u, 21v, 21w, 22u, 22v, 22w for control of the outputs 2u, 2v, 2w. A DC source is connected to bridge leg DC input terminals 30, 31 for supply of DC power. A DC capacitor 32 is located close to the bridge legs in order to avoid large voltage overshoots.

Figure 4:
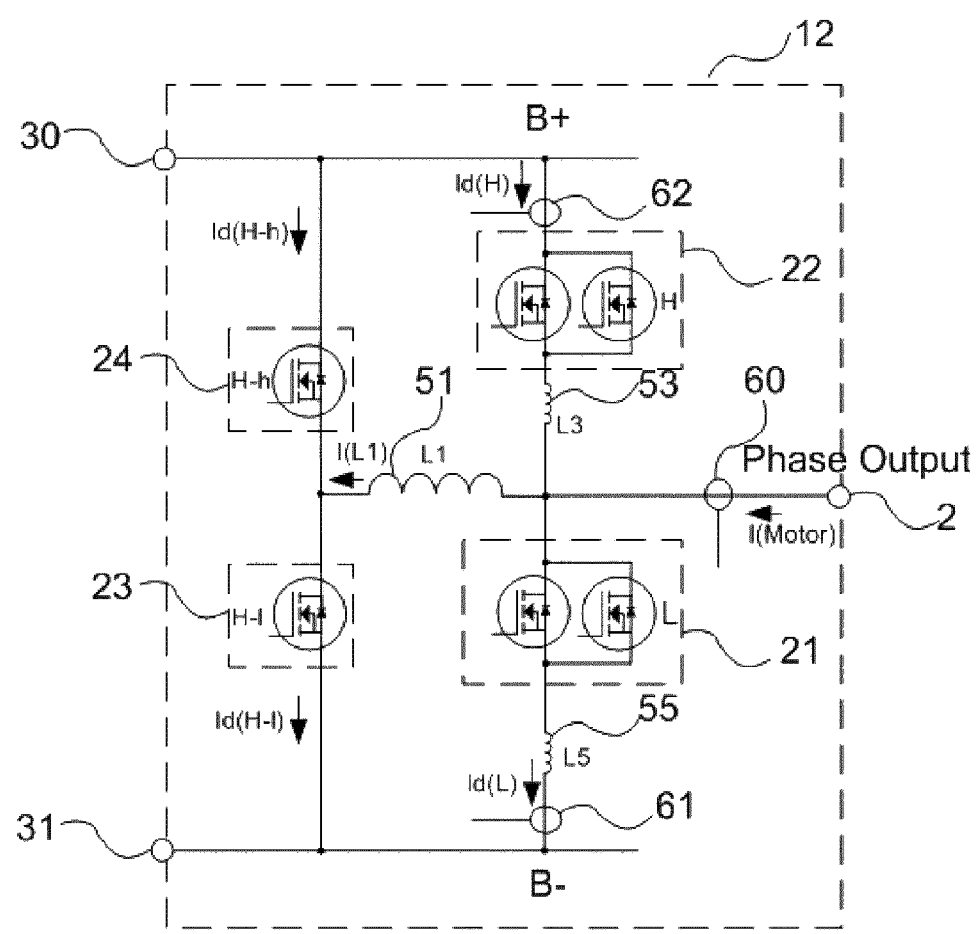
FIG. 4 shows a bridge leg according to a first aspect of the present invention.

FIG. 4 shows a bridge leg according to a first aspect of the present invention. The bridge leg 12 switches a DC voltage at its respective input terminal 30, 31 to produce an AC voltage at its output terminal 2 for supply to an inductive load such as a motor. The bridge leg 12 comprises two main switches; a first switch assembly 22 and a second switch assembly 21. Further, the bridge leg 12 comprises two help switches; a third switch assembly 24 and a fourth switch assembly 23. Moreover, the bridge leg 12 according to this particular embodiment of the present invention comprises at least a first inductive element 51. This may be a separate inductor such as a ferrite core with/without an air-gap around a conductor that is connected between the main switches and the help switches, or could alternative be embodied in the form of a stray inductance of e.g. a cable. The third switch assembly 24 and the fourth switch assembly 23 are controlled such that reverse current through either of the first switch assembly 22 or the second switch assembly 21 is reduced compared to bridge leg output current prior to the moment of switching of the bridge leg output 2.

In an embodiment of the present invention, one or more current measurement devices 62, 61 are used for measuring the current Id(H) and Id(L), respectively. The measurements show at least the direction of the current. An alternative current measurement device 60 can be implemented at the output 2 for measuring I(motor). Inductances 53 and 55 are stray inductances due to wiring.

Figure 5:
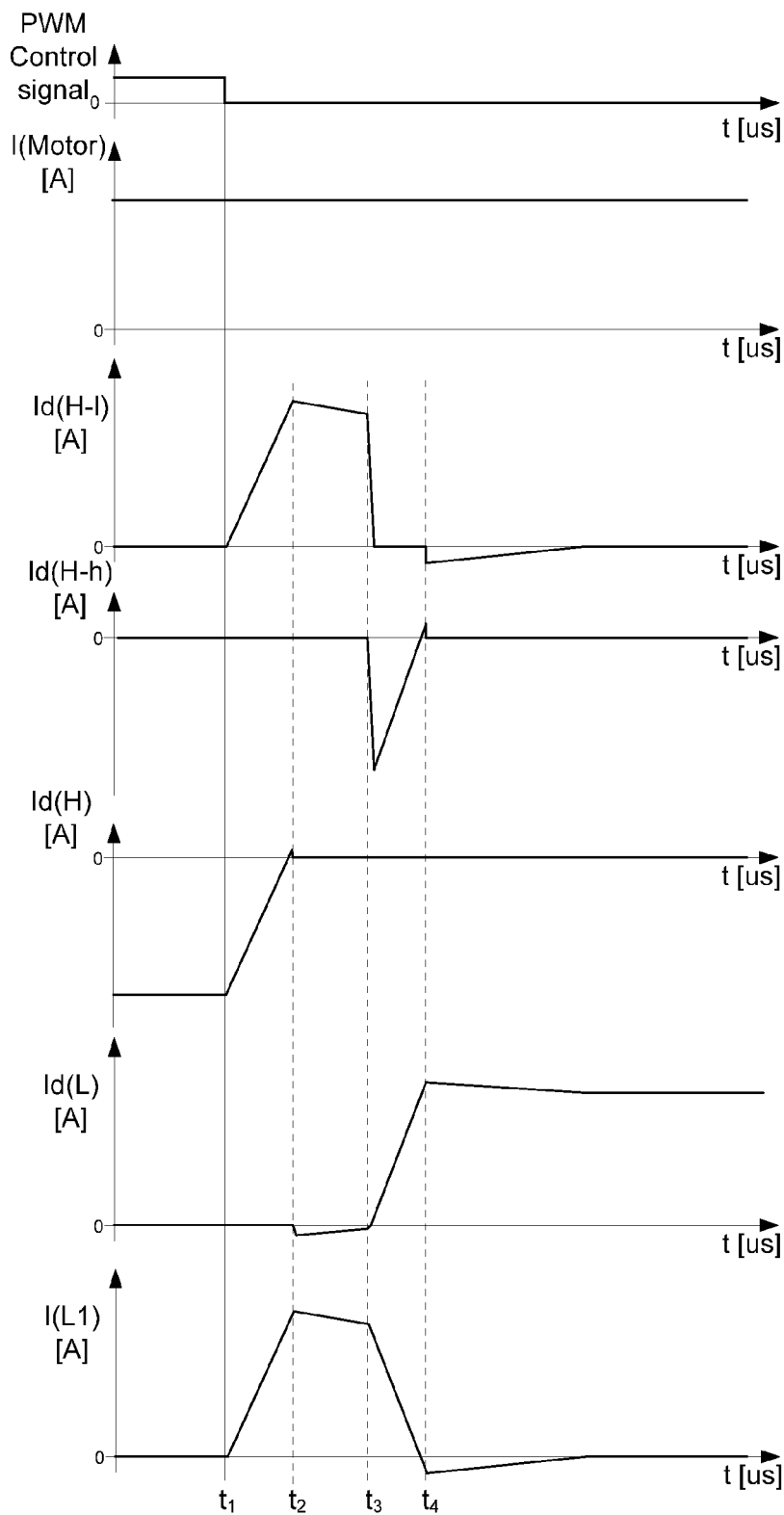
FIG. 5 illustrates detailed operation of the bridge leg performing reverse to forward current switching according to embodiments of the invention when current is flowing in to the bridge leg via the output.

FIG. 5 illustrates detailed operation of the bridge leg 12 according to embodiments of the invention when current is flowing in to the bridge leg via the output 2. Assuming that the first switch 22 is ON and all the other switches 21, 23, 24 are OFF and it is desired to go to a state where the first switch 22 is OFF and the second switch 21 is ON, i.e. reverse to forward current switching is to be performed.

In prior art, as described with reference to FIGS. 1-3, when the first switch 22 is turned OFF, the current will flow in the body diode of the first switch 22. After a few microseconds, the second switch 21 is turned on. Since current has been flowing in the first switch diode, it will consequently conduct in the reverse direction for a short while; a reverse recovery last for about tenth of a microsecond or less, after which it rapidly will turn off. This rapid turn-off will generate high voltages in circuit inductances 53, 55 that may lead to destruction of the main switches 21, 22 and will also generate high EMC.

With the illustrated embodiment, the operation will instead be as follows (with reference to FIG. 5). First, the fourth switch 23 is turned on. Current will then start flowing in the first inductive element 51, and after a short while the current in inductor 51 will be equal to the output current. At this instance, the current Id(H) through the first switch 22, as measured by current measuring device 62, will change direction and go positive. This direction change is detected and initiates turn-off of the first switch 22. When the first main switch 22 has been turned off, the second main switch 21 can be turned on. When the second main switch 21 is turned on, the fourth switch 23 is turned off. The current in the inductor 51 will continue to flow through the body diode of the third switch 24 and the energy of the inductor 51 will be transferred back to the DC bus 30, 31. Subsequently, a reverse recovery of the diode in the third switch 24 will occur, but this will be relatively small since the magnitude of the current is limited by the inductance 51. Since the help switches 23, 24 only will operate for a very short time, series and parallel Schottky diodes can be arranged around the help switches.

Since the energy stored in the inductor 51 is fed back to the DC bus 30, 31, the size of the inductor can be rather large without energy loss. However, it is still very much smaller in size as compared to the load inductance at the bridge leg output 2.

An alternative way to control the main switches 21, 22 and the help switches 23, 24 is to have a microprocessor calculate switching timings based on knowledge about bridge leg output current, inductor value and supply (battery) voltage.

Figure 6:
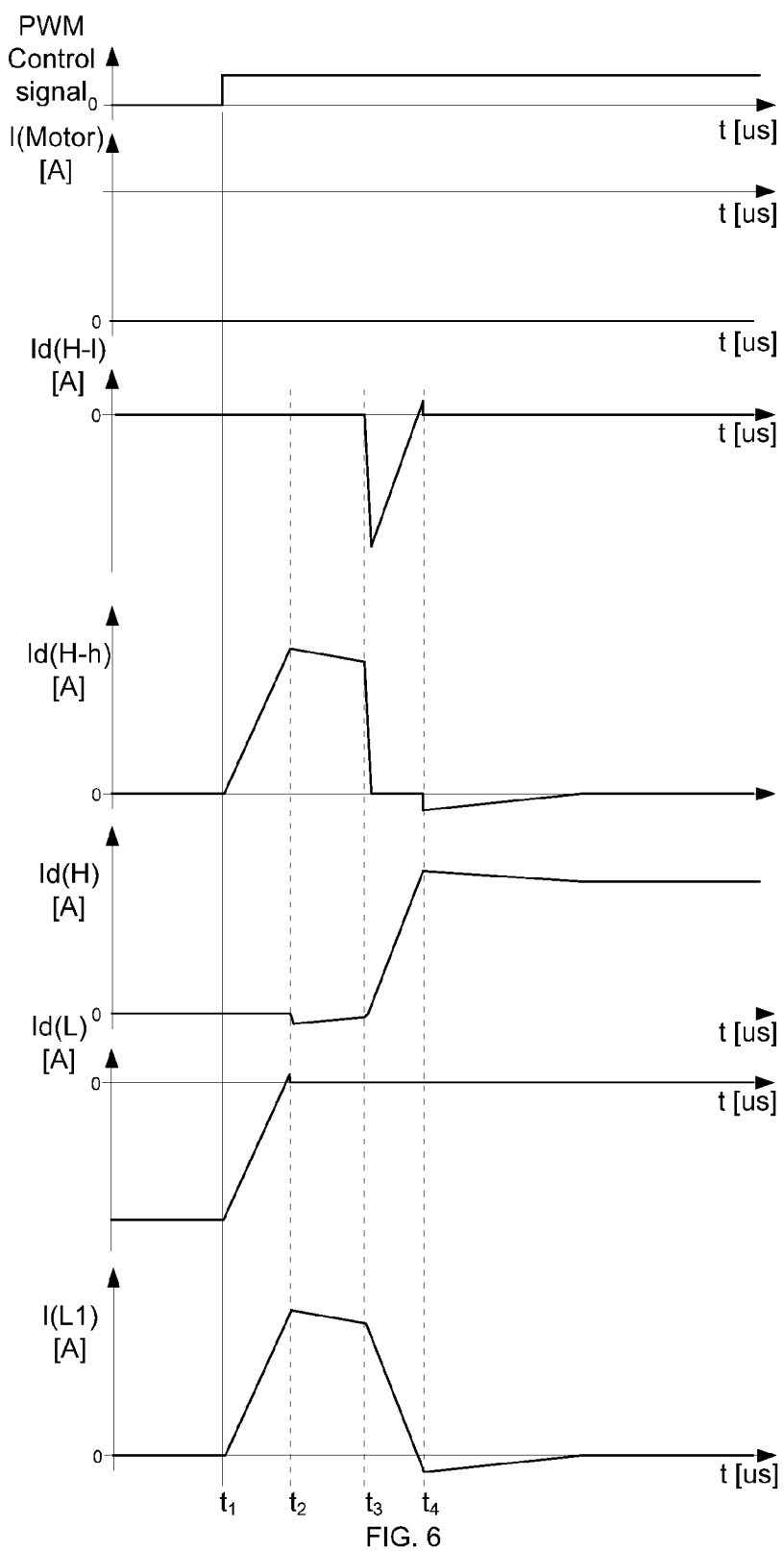
FIG. 6 illustrates detailed operation of the bridge leg reverse to forward current switching according to further embodiments of the invention when current is flowing out from the bridge leg via the output.

FIG. 6 illustrates detailed operation of the bridge leg 12 according to embodiments of the invention when current is flowing out from the bridge leg via the output 2. Assuming that the second switch 21 is ON and all the other switches 22, 23, 24 are OFF and it is desired to go to a state where the second switch 21 is OFF and the first switch 22 is ON, i.e. reverse to forward current switching is to be performed.

In prior art, as described with reference to FIGS. 1-3, when the second switch 21 is turned OFF, the current will flow in the body diode of the second switch 21. After a few microseconds, the first switch 22 is turned on. Since current has been flowing in the second switch diode, it will consequently conduct in the reverse direction for a short while; a reverse recovery last for about tenth of a microsecond or less, after which it rapidly will turn off. Again, this rapid turn-off will generate high voltages in circuit inductances 53, 55 that may lead to destruction of the main switches 21, 22 and will also generate high EMC.

With the illustrated embodiment, the operation will instead be as follows (with reference to FIG. 6). First, the third switch 24 is turned on. Current will then start flowing in the first inductive element 51, and after a short while the current in inductor 51 will be equal to the output current. At this instance, the current Id(L) through the second switch 21, as measured by current measuring device 61, will change direction and go positive. This direction change is detected (e.g. by a comparator) and initiates turn-off of the second switch 21. When the second main switch 21 has been turned off, the first main switch 22 can be turned on. When the first main switch 22 is turned on, the third switch 24 is turned off. The current in the inductor 51 will continue to flow through the body diode of the fourth switch 23 and the energy of the inductor 51 will be transferred back to the DC bus 30, 31. Subsequently, a reverse recovery of the diode in the fourth switch 23 will occur, but this will be relatively small since the magnitude of the current is limited by the inductance 51. Since the help switches 23, 24 only will operate for a very short time, series and parallel Schottky diodes can be arranged around the help switches.

There exist alternative sequences to control the timing, for example when the main switches 21, 22 consist of IGBT power transistors, as will be described in the following.

Assuming that the first switch 22 is ON and all the other switches 21, 23, 24 are OFF and it is desired to go to a state where the first switch 22 is OFF and the second switch 21 is ON, i.e. reverse to forward current switching is to be performed. The operation will instead be as follows (not illustrated). When the first switch assembly 22 is conducting reverse current, the first switch assembly 22 is switched off, the fourth switch 23 is turned on. Current will then start flowing in the first inductive element 51, and after a short while the current in inductor 51 will be equal to the output current. At this instance, the current Id(H) through the first switch 22, as measured by current measuring device 62, will change direction and go positive. Now the second main switch 21 is turned on, and the fourth switch 23 is turned off. The current in the inductor 51 will continue to flow through the diode of the third switch 24 and the energy of the inductor 51 will be transferred back to the DC bus 30, 31. Subsequently, a reverse recovery of the diode in the third switch 24 will occur, but this will be relatively small since the magnitude of the current is limited by the inductance 51. Since the help switches 23, 24 only will operate for a very short time, series and parallel Schottky diodes can be arranged around the help switches.

In case the current is flowing out from the bridge leg via the output 2, the sequence will be as follows. Assuming that the second switch 21 is ON and all the other switches 22, 23, 24 are OFF and it is desired to go to a state where the second switch 21 is OFF and the first switch 22 is ON, i.e. reverse to forward current switching is to be performed.

The operation will instead be as follows (not illustrated). When the second switch assembly 21 is conducting reverse current, the second switch assembly 21 is switched off, the third switch 24 is turned on. Current will then start flowing in the first inductive element 51, and after a short while the current in inductor 51 will be equal to the output current. At this instance, the current Id(L) through the second switch 21, will change direction and go positive. Now the first main switch 22 can be turned on. When the first main switch 22 is turned on, the third switch 24 is turned off. The current in the inductor 51 will continue to flow through the diode of the fourth switch 23 and the energy of the inductor 51 will be transferred back to the DC bus 30, 31.

In yet an alternative, the sequences can be operated as follows. Assuming that the first switch 22 is ON and all the other switches 21, 23, 24 are OFF and it is desired to go to a state where the first switch 22 is OFF and the second switch 21 is ON, i.e. reverse to forward current switching is to be performed. The operation will instead be as follows (not illustrated). When the first switch assembly 22 is conducting reverse current, the fourth switch 23 is turned on. The first switch assembly 22 is switched off in between the forth switch assembly 23 is switched on and the time when the reverse current in the first switch assembly is reduced to zero or slightly forward. Current will then start flowing in the first inductive element 51, and after a short while the current in inductor 51 will be equal to the output current or slightly above. Now the second main switch 21 is turned on, and the fourth switch 23 is turned off. The current in the inductor 51 will continue to flow through the diode of the third switch 24 and the energy of the inductor 51 will be transferred back to the DC bus 30, 31.

In case the current is flowing out from the bridge leg via the output 2, the sequence will be as follows. Assuming that the second switch 21 is ON and all the other switches 22, 23, 24 are OFF and it is desired to go to a state where the second switch 21 is OFF and the first switch 22 is ON, i.e. reverse to forward current switching is to be performed.

The operation will instead be as follows (not illustrated). When the second switch assembly 21 is conducting reverse current, the third switch 24 is turned on. The second switch assembly 21 is switched off in between the third switch 24 is switched on and the time when the reverse current in the second switch assembly is reduced to zero or slightly forward. Current will then start flowing in the first inductive element 51, and after a short while the current in inductor 51 will be equal to the output current or slightly above. Now the first main switch 22 is turned on, and the third switch 24 is turned off. The current in the inductor 51 will continue to flow through the diode of the fourth switch 23 and the energy of the inductor 51 will be transferred back to the DC bus 30, 31

Figure 7:
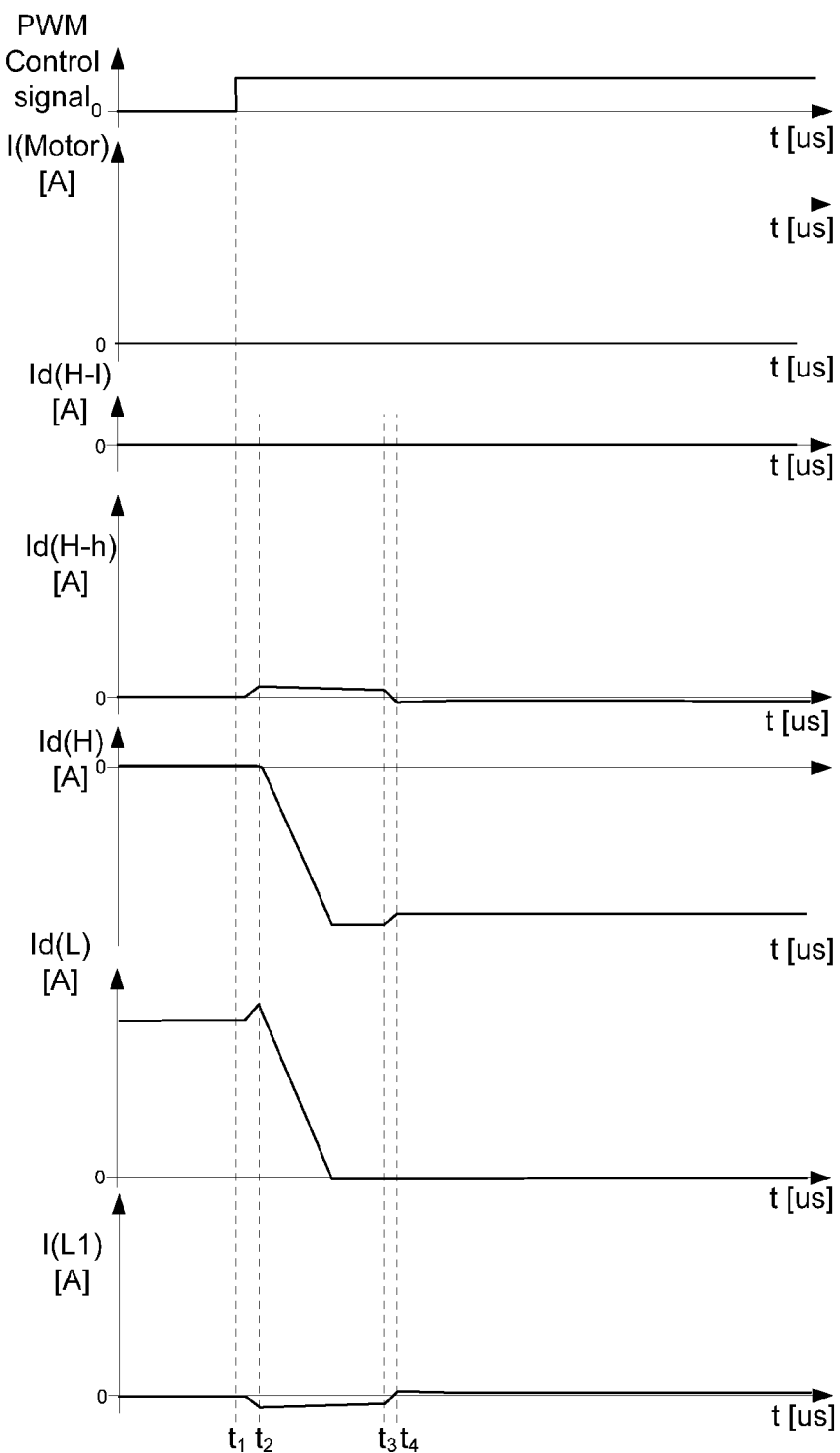
FIG. 7 illustrates detailed operation of the bridge leg forward to reverse current switching according to embodiments of the invention when current is flowing in to the bridge leg via the output.

FIG. 7 illustrates detailed operation of the bridge leg 12 according to embodiments of the invention when current is flowing in to the bridge leg via the output 2. Assuming that the second switch 21 is ON and all the other switches 22, 23, 24 are OFF and it is desired to go to a state where the second switch 21 is OFF and the first switch 22 is ON, i.e. forward to reverse current switching is to be performed. This switching has no reverse recovery problem (not even in the prior art bridge leg previously discussed) and could thus be successfully performed without using the switches 23, 24. However the same control sequence may be used and is illustrated in FIG. 7.

First the third switch 24 is turned on. Current will then start to flow in the first inductive element 51, and after a short time it is detected that the current through the second switch 21, measured by current measuring device 61 is positive. This condition initiates the turn-off of the second switch 21. When second switch 21 has been turned off the current will start to transfer to the first switch 22 anti-parallel diode and the first switch 22 can be turned on after the normal dead-band time. When the first switch 22 is turned on the fourth switch 24 is turned off. As can be seen in FIG. 7, the voltage drop over the first switch 22 in reverse direction causes some current to flow in the third switch 24 reverse direction. However, if the first switch 22 has sufficiently low voltage drop, this current will not flow.

In order to avoid diode recovery for the main switches 21, 22, it is preferable that the MOSFET voltage drop, depending on the RDS(on) when conducting current in reverse direction, is lower than the body diode forward voltage drop in order to be able to avoid diode reverse recovery in the main switches 21, 22.

Figure 8A:
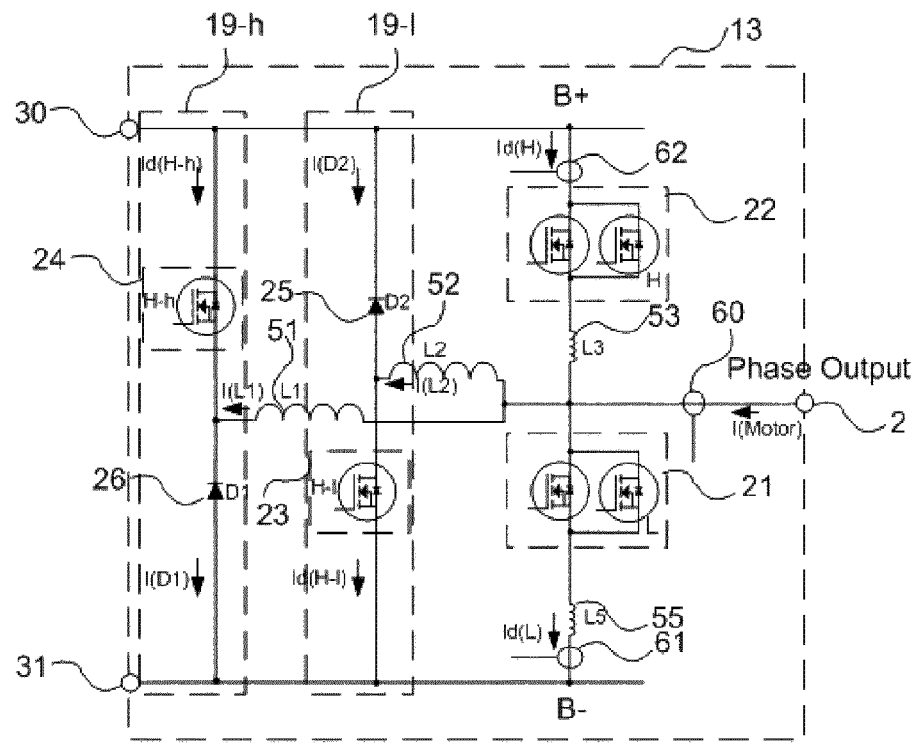
FIG. 8a shows a bridge leg according to a second aspect of the present invention.

FIG. 8a shows a bridge leg according to a second aspect of the present invention. The bridge leg 13 switches a DC voltage at its respective input terminal 30, 31 to produce an AC voltage at its output terminal 2 for supply to an inductive load such as a motor. The bridge leg 13 comprises two main switches; a first switch assembly 22 and a second switch assembly 21. Further, the bridge leg 13 comprises two help switches; a third switch assembly 24 and a fourth switch assembly 23. Moreover, the bridge leg 13 according to this particular embodiment of the present invention comprises a first inductive element 51, a second inductive element 52, a first diode 26 and a second diode 25. This may be a separate inductor such as a ferrite core with/without an air-gap around a conductor that is connected between the main switches and the help switches, or could alternative be embodied in the form of a stray inductance of e.g. a cable. The third switch assembly 24 and the fourth switch assembly 23 are controlled such that reverse current through either of the first switch assembly 22 or the second switch assembly 21 is reduced compared to bridge leg output current prior to the moment of switching of the bridge leg output 2.

Again, in an embodiment of the present invention in the second aspect, one or more current measurement devices 62, 61 are used for measuring the current Id(H) and Id(L), respectively. The measurements show at least the direction of the current. An alternative current measurement device 60 can be implemented at the output 2 for measuring I(motor). Inductances 53 and 55 are stray inductances due to wiring.

In line with the previously described first aspect of the present invention, assuming in the second aspect that, when current is flowing in to the bridge leg 13 via the output 2, the first switch 22 is ON and all the other switches 21, 23, 24 are OFF and it is desired to go to a state where the first switch 22 is OFF and the second switch 21 is ON i.e. reverse to forward current switching is to be performed.

With the illustrated embodiment, the operation will be as follows. First, the fourth switch 23 is turned on. Current will then start flowing in the second inductive element 52, and after a short while the current in the second inductor 52 will be equal to the output current. At this instance, the current Id(H) through the first switch 22, as measured by current measuring device 62, will change direction and go positive. This direction change is detected and initiates turn-off of the first switch 22. When the first main switch 22 has been turned off, the second main switch 21 can be turned on. When the second main switch 21 is turned on, the fourth switch 23 is turned off. The current in the second inductor 52 will continue to flow through the second diode 25 and the energy of the second inductor 52 will be transferred back to the DC bus 30, 31. Subsequently, a reverse recovery of the second diode 25 will occur, but this will be relatively small since the magnitude of the current is limited by the second inductance 52. The second diode 25 could be a Schottky diode with very low reverse recovery charge.

In a further scenario, when current is flowing out from the bridge leg 13 via the output 2, it is assumed that the second switch 21 is ON and all the other switches 22, 23, 24 are OFF and it is desired to go to a state where the second switch 21 is OFF and the first switch 22 is ON.

With the illustrated embodiment, the operation will be as follows. First, the third switch 24 is turned on. Current will then start flowing in the first inductive element 51, and after a short while the current in inductor 51 will be equal to the output current. At this instance, the current Id(L) through the second switch 21, as measured by current measuring device 61, will change direction and go positive. This direction change is detected (e.g. by a comparator) and initiates turn-off of the second switch 21. When the second main switch 21 has been turned off, the first main switch 22 can be turned on. When the first main switch 22 is turned on, the third switch 24 is turned off. The current in the first inductor 51 will continue to flow through the first diode 26 and the energy of the inductor 51 will be transferred back to the DC bus 30, 31. Subsequently, a reverse recovery of the first diode 26 will occur, but this will be relatively small since the magnitude of the current is limited by the first inductance 51.

Figure 8B:
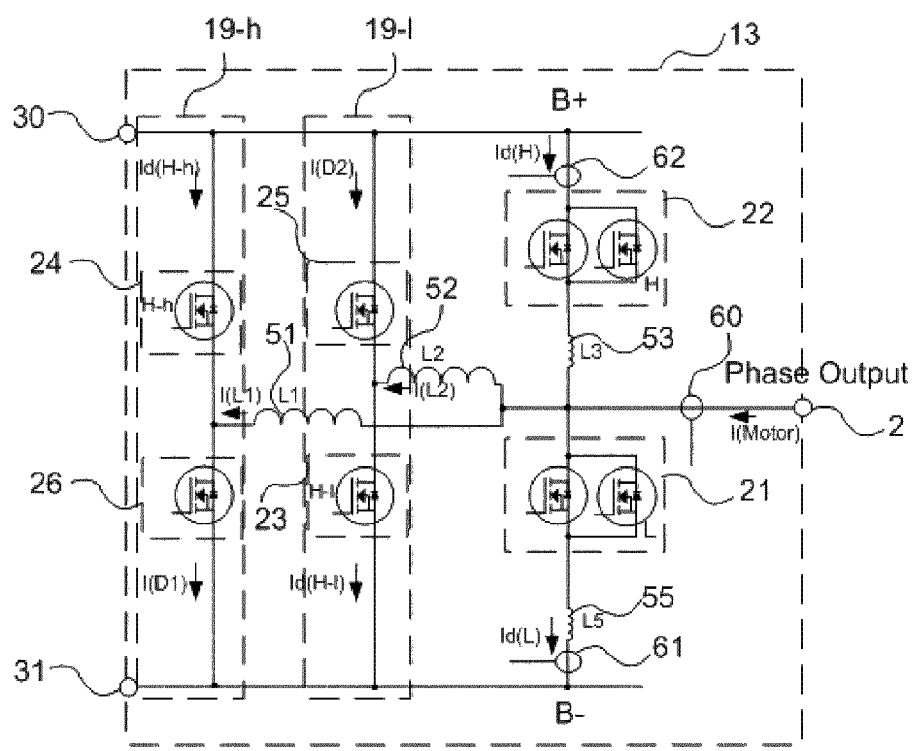
FIG. 8b shows a bridge leg according to an alternative embodiment of the second aspect of the present invention.

FIG. 8b shows an alternative embodiment of the bridge leg 13 of the second aspect of the present invention, where the first and second diode 25, 26 are replaced by transistors (in FIG. 8b embodied in the form of MOSFETS). The functionality is the same as that described with reference to FIG. 8a.

Figure 9:
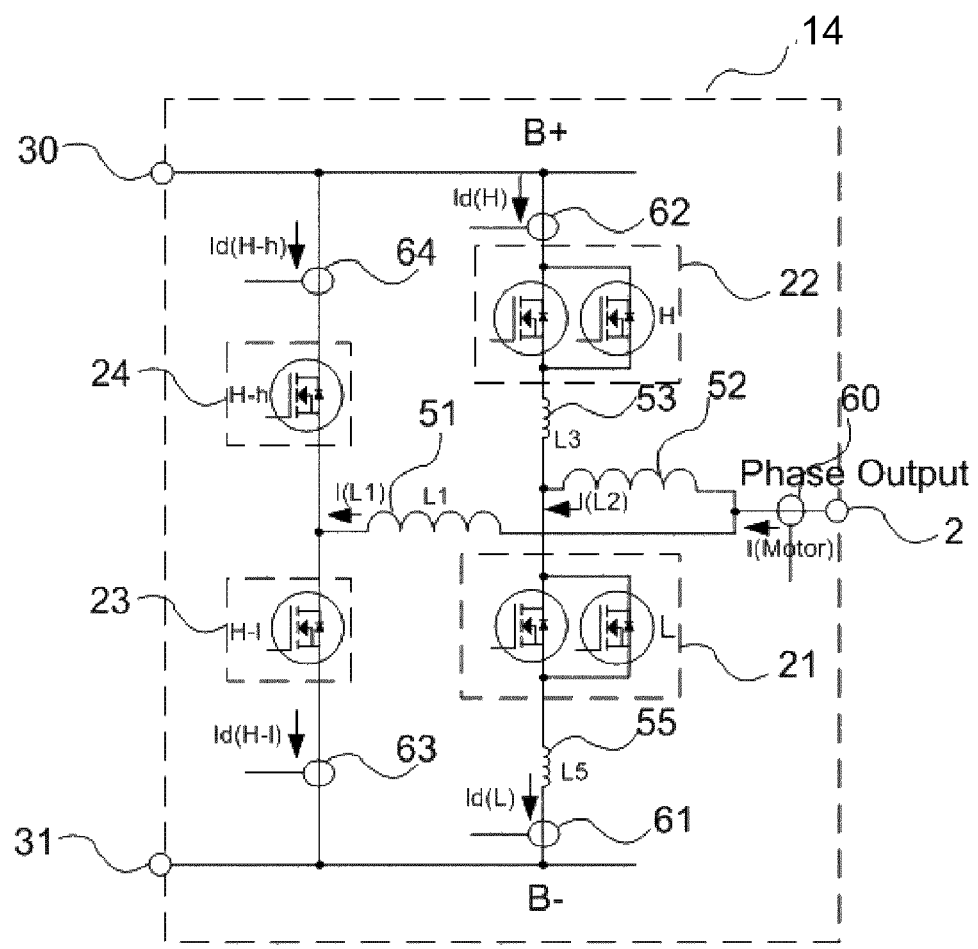
FIG. 9 shows a bridge leg according to a third aspect of the present invention.

FIG. 9 shows a bridge leg 14 according to a third aspect of the present invention. As compared to that shown in FIG. 4, this bridge leg 14 further comprises a second inductive element 52. The third and fourth switches 23, 24 can be made equal to the first and second switches 21, 22 in terms of current and voltage capability and the phase current can alternate between the third and fourth switches 23, 24 and the first and second switches 21, 22. Thus, the switch pairs 21, 22 and 23, 24 can alternate as main and help switches in order to share losses equally.

In this context, it should be noted that any number of "sub bridge legs" comprising two switches with an inductive element connected between their point of interconnection and the bridge leg output can be included in the bridge legs according to embodiments of the present invention.

Operation is as follows when current is flowing in to the bridge leg 14 via the output 2. The first switch 22 is ON and all the other switches 21, 23, 24 are OFF and it is desired to go to a state where the first switch 22 is OFF and the fourth switch 23 is ON i.e. reverse to forward current switching is to be performed.

With the illustrated embodiment, the operation will be as follows. First, the fourth switch 23 is turned on. Current will then start flowing in the first inductive element 51, and after a short while the current in the first inductor 51 will be equal to the output current. At this instance, the current Id(H) through the first switch 22, as measured by current measuring device 62, will change direction and go positive. This direction change is detected and initiates turn-off of the first switch 22 and the transfer is finished.

When the fourth switch 23 is ON and all other switches 21, 22, 24 are OFF, the following operation is undertaken. Assume current is still flowing in from the load through the bridge leg output 2. It is desired to transition to a state where the fourth switch 23 is OFF and the third switch 24 is ON to alternate the current equally between the first and second switches 21, 22 and the third and fourth switches 23, 24. With the proposed embodiment, the sequence will be as follows. First, the fourth switch 23 is turned off. Current will then start flowing in the diode of the third switch 24 as the first inductance 51 will continue to conduct the current. The third switch 24 can then be turned on and the current be transferred from the diode in the third switch 24 to the MOSFET channel since the voltage drop in the MOSFET reverse direction is lower than the diode forward drop for normal current ranges.

When switching from a state where the third switch 24 is ON and all other switches 21, 22, 23 are OFF the following process is undertaken. Assume current is still flowing in from the motor to the bridge leg 14 via the output 2, and it is desirable to transition to a state where the third switch 24 is OFF and the second switch 21 is ON to alternate the current equally between the first and second switches 21, 22 on the one hand and the third and fourth switches 23, 24 on the other. With the proposed embodiment, the operation will be as follows.

First, the second switch 21 is turned on. Current will then start flowing in the second inductance 52, and after a short while the current in the second inductance 52 will be equal to the output current. At this time the current Id(H-h), as measured by current measuring device 64, will change direction and go positive. This direction change is detected and initiates the turn-off of the third switch 24 and the transfer is finished.

This shows operation for dividing the phase current equally on the first and second switches 21, 22 and the third and fourth switches 23, 24. For motor phase current flowing out from bridge leg output 2, corresponding operation is undertaken.

Figure 10:
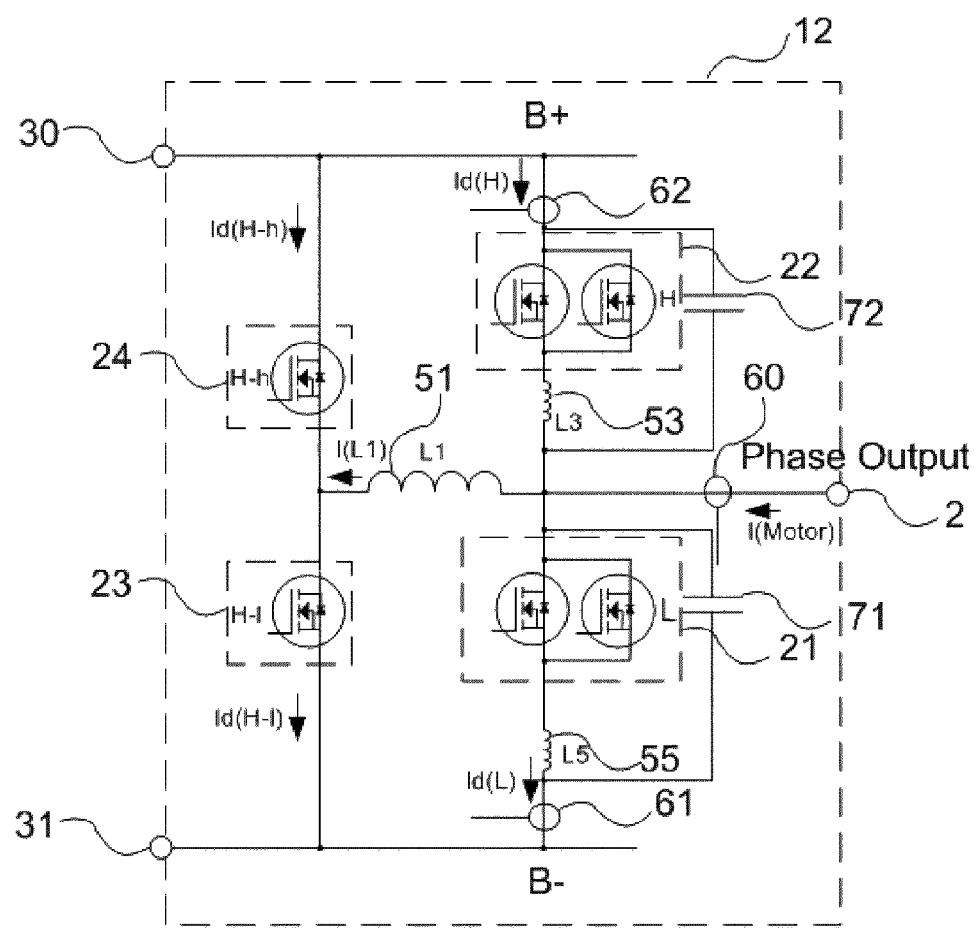
FIG. 10 illustrates still a further embodiment of the bridge leg according to the present invention.

FIG. 10 illustrates still a further embodiment of the bridge leg 12 according to the present invention, where a capacitor 72, 71 is connected in parallel to the first and second switches 22, 21, respectively. Control of the bridge leg 12 is undertaken such that the parallel capacitors 71, 72 transfer from full DC voltage to only a first and second switch 21, 22 voltage drop via control of the third and the fourth switches 23, 24 by current conducted trough the first inductor 51 together with the load current. This implies that the dv/dt over the capacitors 71, 72 will fall and rise controllable, and both the turn off as well as turn on of the main switches 21, 22 is done with low voltage.

In the following, detailed operation of the bridge leg 12 according to this embodiment of the invention is described when current is flowing in to the bridge leg 12 via the output 2. Assuming that the first switch 22 is ON and all the other switches 21, 23, 24 are OFF and it is desired to go to a state where the first switch 22 is OFF and the second switch 21 is ON.

In prior art, as described with reference to FIGS. 1-3, when the first switch 22 is turned OFF, the current will flow in the body diode of the first switch 22. After a few microseconds, the second switch 21 is turned on. Since current has been flowing in the first switch diode, it will consequently conduct in the reverse direction for a short while; a reverse recovery last for about tenth of a microsecond or less, after which it rapidly will turn off. This rapid turn-off will generate high voltages in circuit inductances 53, 55 that may lead to destruction of the main switches 21, 22 and will also generate high EMC. Therefore, the capacitors 71, 72 are added such that high voltage is suppressed.

With the illustrated embodiment, the operation will instead be as follows. First, the fourth switch 23 is turned on. Current will then start flowing in the first inductive element 51, and after a short while the current in inductor 51 will be equal to the output current. At this instance, the current Id(H) through the first switch 22, as measured by current measuring device 62, will change direction and go positive. This direction change is detected and initiates turn-off of the first switch 22. When the first main switch 22 has been turned off, the fourth switch 23 is on for a further time period required to charge the first capacitor 72 and discharge the second capacitor 71. After said charging/discharging the second main switch 21 can be turned on. When the second main switch 21 is turned on, the fourth switch 23 is turned off. The current in the inductor 51 will continue to flow through the body diode of the third switch 24 and the energy of the inductor 51 will be transferred back to the DC bus 30, 31. Subsequently, a reverse recovery of the diode in the third switch 24 will occur, but this will be relatively small since the magnitude of the current is limited by the inductance 51. Since the help switches 23, 24 only will operate for a very short time, series and parallel Schottky diodes can be arranged around the help switches.

Figure 11:
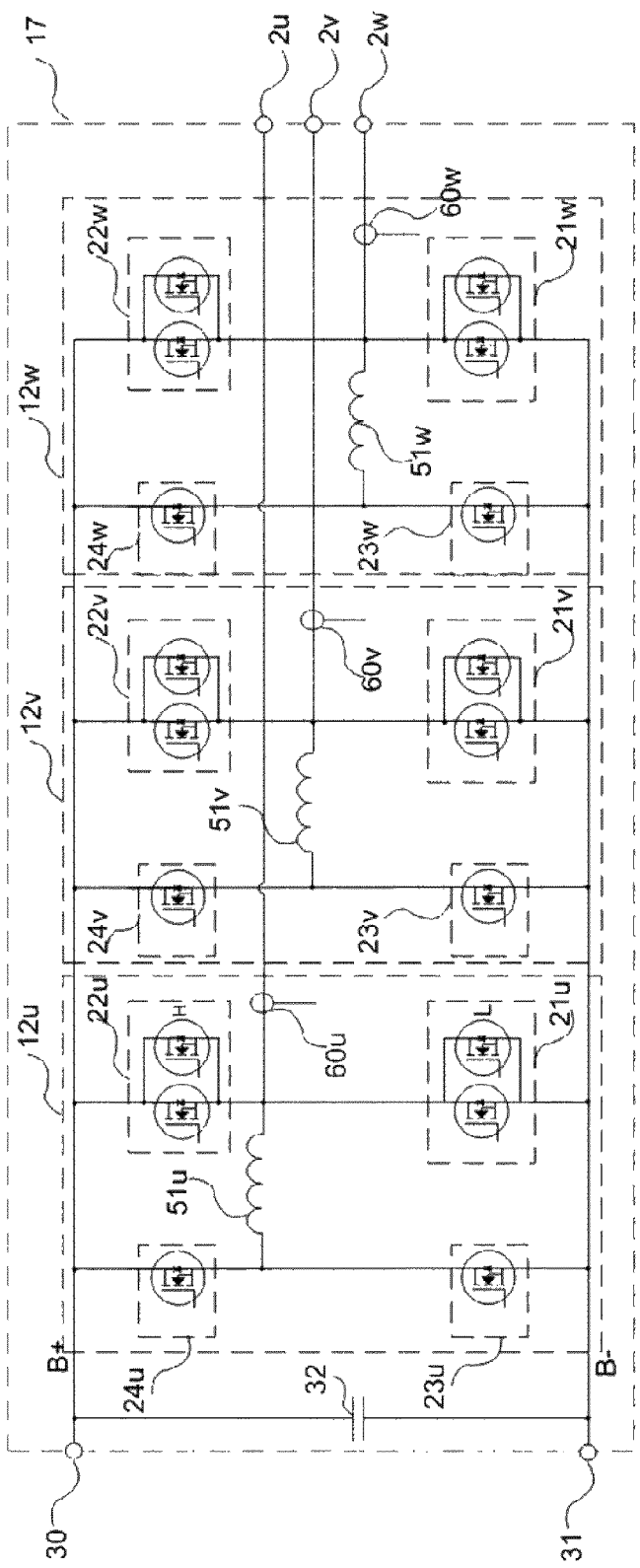
FIG. 11 shows three bridge legs as previously shown in FIG. 4 configured into forming a three-phase DC to AC converter according to a further embodiment of the present invention.

FIG. 11 shows three bridge legs 12u, 12v, 12w as previously shown e.g. in FIG. 4 configured into forming a three-phase DC to AC converter 17 according to a further embodiment of the present invention. The respective bridge leg U, V and W output $2u$, $2v$, $2w$ are normally connected to an electrical motor and the fundamental voltage amplitude and frequency to the motor controlled by pulse width modulation, PWM. A microcontroller and a gate driver (not shown) generate PWM gate signals for all switches $21u$, $21v$, $21w$, $22u$, $22v$, $22w$, $23u$, $23v$, $23w$, $24u$, $24v$, $24w$ for control of all the outputs $2u$, $2v$, $2w$. A DC source is connected to bridge leg DC input terminals 30, 31 for supply of DC power. A DC capacitor 32 is located close to the bridge legs $12u$, $12v$, $12w$ in order to avoid large voltage overshoots over the bridge legs.

Figure 12:
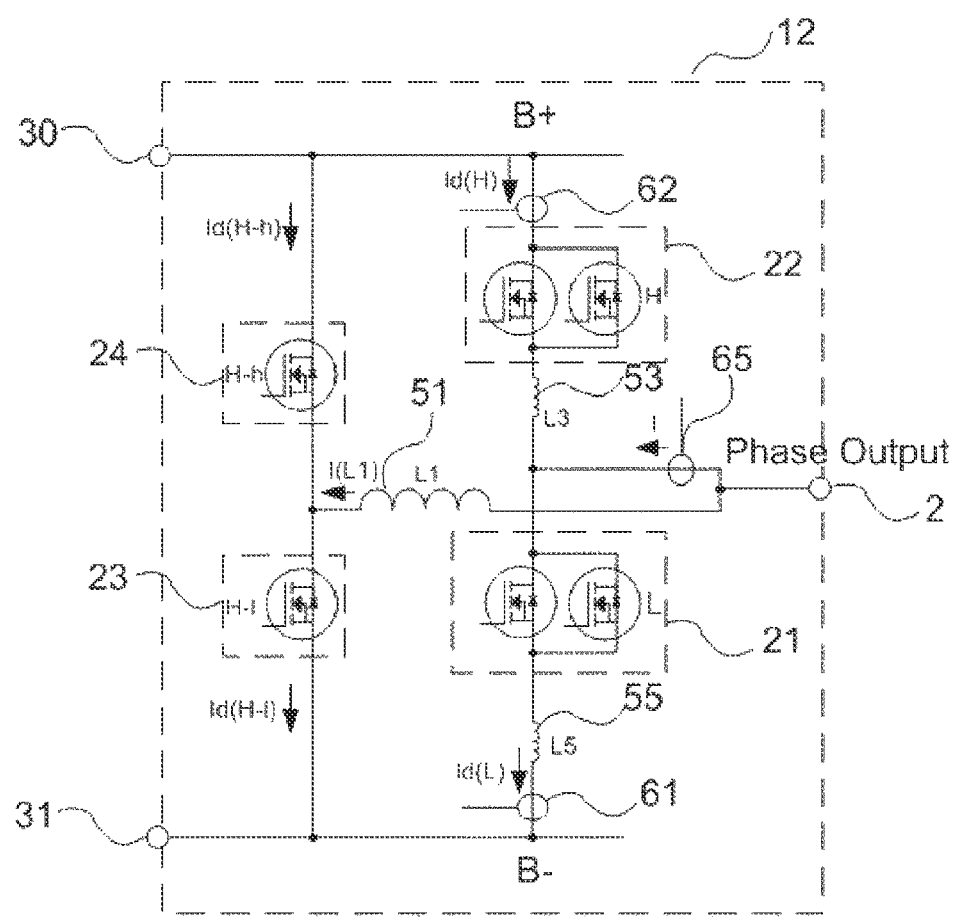
FIG. 12 shows an alternative placement of current measurement according to yet another embodiment of the present invention.

FIG. 12 shows an alternative placement of current measurement according to yet another embodiment of the present invention. For the control of the switches 21, 22, 23, 24, the current is measured by the current sensor 65 in the conductor located between main switches' 21, 22 common connection point and the inductor's 51 (one or more) connection point to the bridge leg output 2.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A bridge leg circuit for switching a DC voltage at a pair of bridge leg input terminals to produce an AC voltage at a bridge leg output terminal for supply to an inductive load, the bridge leg circuit comprising:
   a first switch assembly;
   a second switch assembly;
   a third switch assembly;
   a fourth switch assembly; and
   at least a first inductive element; wherein
   the first switch assembly and the second switch assembly are serially connected between the pair of bridge leg input terminals, and the bridge leg output terminal is formed at a point of interconnection of the first switch assembly and the second switch assembly; and
   the third switch assembly and the fourth switch assembly are serially connected between the pair of bridge leg input terminals, and the first inductive element is connected between a point of interconnection of the third switch assembly and the fourth switch assembly and the bridge leg output terminal;
   wherein the third switch assembly and the fourth switch assembly are controlled such that a respective reverse current through either of the first switch assembly or the second switch assembly is reduced compared to a bridge leg output current prior to a moment of switching of the bridge leg output between a forward current and a reverse current to the inductive load; and
   wherein the bridge leg circuit is configured such that:
      when the first switch assembly is conducting reverse current and is to be switched off, the fourth switch assembly is switched on, and when the reverse current in the first switch assembly is reduced, zero or forward, the first switch assembly is switched off, the second switch assembly is switched on and the fourth switch assembly is switched off; and
      when the second switch assembly is conducting reverse current and is to be switched off, the third switch assembly is switched on, and when the reverse current in the second switch assembly is reduced, zero or forward, the second switch assembly is switched off, the first switch assembly is switched on and the third switch assembly is switched off.

2. The bridge leg circuit of claim 1, wherein the third switch assembly and the fourth switch assembly are controlled such that the respective reverse current through the first switch assembly is reduced compared to a load current prior to a moment when the first switch assembly is switched off and that the respective reverse current through the second switch assembly is reduced compared to the load current prior to a moment when the second switch assembly is switched off.

3. The bridge leg circuit of claim 2, wherein the bridge leg circuit is configured such that switching off the first switch assembly is initiated by a change from a reverse direction to a forward direction in a current flowing through the first switch assembly.

4. The bridge leg circuit of claim 2, wherein the bridge leg circuit is configured such that switching off the second switch assembly is initiated by a change from a reverse direction to a forward direction in a current flowing through the second switch assembly.

5. The bridge leg circuit of claim 1, wherein the third switch assembly and the fourth switch assembly are controlled such that a respective current through the first switch assembly is zero or in a forward direction at a moment when the first switch assembly is switched off and that a respective current through the second switch assembly is zero or in forward direction at a moment when the second switch assembly is switched off.

6. The bridge leg circuit of claim 1, further comprising:
   a first capacitor coupled in parallel with the first switch assembly; and
   a second capacitor coupled in parallel with the second switch assembly.

7. The bridge leg circuit of claim 1, wherein the respective reverse currents in the first switch assembly and the second switch assembly are measured in the bridge leg.

8. The bridge leg circuit of claim 1, further comprising:
   an output current measuring device arranged to measure the bridge leg output current.

9. The bridge leg circuit of claim 1, further comprising:
   an interconnection point current measuring device arranged to measure a current flowing between the interconnection point of the first switch assembly and the second switch assembly and an interconnection point between the bridge leg output and the first inductive element for controlling the switch assemblies.

10. The bridge leg circuit of claim 1, further comprising:
    a first switch assembly current measuring device arranged to measure a respective current flowing through the first switch assembly; and
    a second switch assembly current measuring device arranged to measure a respective current flowing through the second switch assembly.

11. The bridge leg circuit of claim 1, wherein timing for controlling the switch assemblies is determined by considering the bridge leg output current, a value of the inductive element and a bridge leg input voltage.

12. The bridge leg circuit of claim 1, wherein the first switch assembly and the second switch assembly are metal-oxide-semiconductor field-effect transistors (MOSFETs).

13. The bridge leg circuit of claim 1, wherein the first switch assembly and the second switch assembly are insulated-gate bipolar transistors (IGBTs).

14. The bridge leg circuit of claim 1, wherein the third switch assembly and the fourth switch assembly are metal-oxide-semiconductor field-effect transistors (MOSFETs).

15. The bridge leg circuit of claim 1, wherein the third switch assembly and the fourth switch assembly are insulated-gate bipolar transistors (IGBTs).

16. The bridge leg circuit of claim 1, wherein any of the switch assemblies comprises two or more transistors coupled in parallel.

17. The bridge leg circuit of claim 1, wherein all switch assemblies are arranged to conduct a load current to be output from the bridge leg.

18. The bridge leg circuit of claim 1, wherein any one of the at least a first inductive element comprises one or more stray inductances of another circuit element of the bridge leg.

19. The bridge leg circuit of claim 1, wherein the at least a first inductive elements are configured to not conduct a respective current prior to a moment at which the third switch assembly or the fourth switch assembly is switched on.

20. The bridge leg circuit of claim 1, wherein the third switch assembly and the fourth switch assembly are controlled such that a respective reverse current through either of the first switch assembly or the second switch assembly is reduced compared to the bridge leg output current prior to a moment of switching of the bridge leg output by at least 50%.

21. The bridge leg circuit of claim 1, comprising two bridge leg circuits configured to form an H-bridge, a respective output of each of the bridge leg circuits being supplied to the inductive load.

22. The bridge leg circuit of claim 1, comprising three bridge leg circuits configured to form a three-phase bridge, the a respective output of each of the bridge leg circuits being supplied to the inductive load.

23. A bridge leg circuit for switching a DC voltage at a pair of bridge leg input terminals to produce an AC voltage at a bridge leg output terminal for supply to an inductive load, the bridge leg circuit comprising:
a first switch assembly;
a second switch assembly;
a third switch assembly;
a fourth switch assembly;
a first inductive element;
at least a second inductive element;
a sixth switch assembly; and
a seventh switch assembly; wherein
the first switch assembly and the second switch assembly are serially connected between the pair of bridge leg input terminals, and the bridge leg output terminal is formed at a point of interconnection of the first switch assembly and the second switch assembly;
the third switch assembly and the sixth switch assembly are serially connected between the pair of bridge leg input terminals, and the first inductive element is connected between a point of interconnection of the third switch assembly and the sixth switch assembly and the bridge leg output terminal; and
the seventh switch assembly and the fourth switch assembly are serially connected between the pair of bridge leg input terminals, and the second inductive element is connected between a point of interconnection of the seventh switch assembly and the fourth switch assembly and the bridge leg output terminal;
wherein the third switch assembly and the fourth switch assembly are controlled such that a respective reverse current through either of the first switch assembly or the second switch assembly is reduced compared to a bridge leg output current prior to a moment of switching of the bridge leg output between a forward current and a reverse current to the inductive load; and
wherein the bridge leg circuit is configured such that:
when the first switch assembly is conducting reverse current and is to be switched off, the fourth switch assembly is switched on, and when the reverse current in the first switch assembly is reduced, zero or forward, the first switch assembly is switched off, the second switch assembly is switched on and the fourth switch assembly is switched off; and
when the second switch assembly is conducting reverse current and is to be switched off, the third switch assembly is switched on, and when the reverse current in the second switch assembly is reduced, zero or forward, the second switch assembly is switched off, the first switch assembly is switched on and the third switch assembly is switched off.

24. The bridge leg circuit of claim 23, wherein the sixth switch assembly and the seventh switch assembly are transistors.

25. The bridge leg circuit of claim 23, wherein the sixth switch assembly and the seventh switch assembly are diodes.

26. A bridge leg circuit for switching a DC voltage at a pair of bridge leg input terminals to produce an AC voltage at a bridge leg output terminal for supply to an inductive load, the bridge leg circuit comprising:
a first switch assembly;
a second switch assembly;
a third switch assembly;
a fourth switch assembly;
a first inductive element; and
at least a second inductive element; wherein
the first switch assembly and the second switch assembly are serially connected between the pair of bridge leg input terminals, and the second inductive element is connected between a point of interconnection of the first switch assembly and the second switch assembly and the bridge leg output terminal;
the third switch assembly and the fourth switch assembly are serially connected between the pair of bridge leg input terminals, and the first inductive element is connected between a point of interconnection of the third switch assembly and the fourth switch assembly and the bridge leg output terminal; and
wherein the third switch assembly and the fourth switch assembly are controlled such that a respective reverse current through either of the first switch assembly or the second switch assembly is reduced compared to a bridge leg output current prior to a moment of switching of the bridge leg output between a forward current and a reverse current to the inductive load; and
wherein the bridge leg circuit is configured such that:
when the first switch assembly is conducting reverse current and is to be switched off, the fourth switch assembly is switched on, and when the reverse current in the first switch assembly is reduced, zero or forward, the first switch assembly is switched off, the second switch assembly is switched on and the fourth switch assembly is switched off; and
when the second switch assembly is conducting reverse current and is to be switched off, the third switch assembly is switched on, and when the reverse current in the second switch assembly is reduced, zero or forward, the second switch assembly is switched off, the first switch assembly is switched on and the third switch assembly is switched off.

* * * * *